(12) United States Patent
Kamuf et al.

(10) Patent No.: US 8,161,358 B2
(45) Date of Patent: Apr. 17, 2012

(54) PARITY BIT SOFT ESTIMATION METHOD AND APPARATUS

(75) Inventors: Matthias Kamuf, Lund (SE); Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 12/245,963

(22) Filed: Oct. 6, 2008

(65) Prior Publication Data

US 2010/0088578 A1    Apr. 8, 2010

(51) Int. Cl.
*H03M 13/00* (2006.01)
(52) U.S. Cl. ............... 714/780; 714/755; 714/786
(58) Field of Classification Search ............ 714/780, 714/755, 786, 794–796; 375/262, 341
See application file for complete search history.

(56) References Cited

U.S. PATENT DOCUMENTS

| | | | |
|---|---|---|---|
| 2001/0039636 A1* | 11/2001 | Hammons et al. | 714/752 |
| 2005/0149841 A1 | 7/2005 | Kyung et al. | |
| 2008/0059869 A1* | 3/2008 | Brewer et al. | 714/801 |
| 2008/0144729 A1* | 6/2008 | Miyoshi et al. | 375/260 |
| 2009/0141826 A1 | 6/2009 | Suzuki et al. | |

FOREIGN PATENT DOCUMENTS

| | | |
|---|---|---|
| EP | 1383246 A2 | 1/2004 |
| EP | 1487145 A2 | 12/2004 |
| WO | 01/59935 A2 | 8/2001 |

OTHER PUBLICATIONS

Anim-Appiah, K. et al. "Turbo Codes Cascaded with High-Rate Block Codes for (O, k)-Constrained Channels." IEEE Journal on Selected Areas in Communications, vol. 19, No. 4, Apr. 2001, pp. 677-685.
Campello De Souza, J. et al. "Constrained Systems With Unconstrained Positions." IEEE Transactions on Information Theory, vol. 48, No. 4, Apr. 2002, pp. 866-879.
Le Goff, S. et al. "Turbo-Codes and High Spectral Efficiency Modulation." 1994 IEEE International Conference on Communications, vol. 2, May 1994, pp. 645-649.
Bahl, L. R. et al. "Optimal Decoding of Linear Codes for Minimizing Symbol Error Rate." IEEE Transactions on Information Theory, vol. 20, Issue 2, Mar. 1974, pp. 284-287.
Benedetto, S. et al. "A Soft-Input Soft-Output APP Module for Iterative Decoding of Concatenated Codes." IEEE Communications Letters, vol. 1, No. 1, Jan. 1997, pp. 22-24.

(Continued)

*Primary Examiner* — Guy LaMarre
(74) *Attorney, Agent, or Firm* — Coats & Bennett, P.L.L.C.

(57) ABSTRACT

The systematic and parity bits of a symbol are tightly coupled to each other based on the way in which the symbol is encoded. The relationship between the systematic and parity bits can be exploited to improve the accuracy of soft bit estimation for both the systematic bits and parity bits. In one embodiment, a received symbol is processed by demodulating the received symbol to determine an initial soft estimate of each systematic bit and corresponding one or more parity bits in the sequence. The systematic bit sequence is iteratively decoded to revise the soft estimate of the systematic bit. The initial soft estimate of the one or more parity bits associated with each systematic bit is revised based on the revised soft estimate of each systematic bit. The received symbol can be decoded or regenerated based on the revised soft estimate of each systematic bit and corresponding one or more parity bits.

24 Claims, 7 Drawing Sheets

OTHER PUBLICATIONS

Khattak, S. et al. "SIC Based Multi-user Turbo Detector for Non Gray Mapping in Distributed Antenna Systems." Proceedings of the WPMC 2006, San Diego. Available at: http://wwwmns.ifn.et.tu-dresden.de/publications/2006/Khattak_S_WPMC_06.pdf.

Park, G. H. et al. "Performance of Turbo Coded Modulation Schemes in Frequency Selective Rayleigh Fading Channels." Proceedings IEEE 49th Vehicular Technology Conference 1999 (VTV 1999-Spring), May 16-20, 1999, vol. 2, pp. 889-893.

Gioulekas, F. et al. "A High-Speed Analog Turbo Decoder." IEEE International Symposium on Communications and Information Technology, 2004 (ISCIT 2004). Oct. 26-29, 2004, vol. 1, pp. 33-38.

Harrison, J. G. "Implementation of a 3GPP Turbo Decoder on a Programmable DSP Core." 3DSP Corporation, Communications Design Conference, San Jose, California, Oct. 2, 2001.

El Gamel et al., "Iterative Channel Estimation and Decoding for Convolutionally Coded Anti-Jam FH Signals," IEEE Transactions on Communications, Feb. 2002, pp. 321-331, vol. 40, No. 2, IEEE Service Center, Piscataway, NJ, US.

El Gamel et al., "Turbo Codes with Channel Estimation and Dynamic Power Allocation for Anti-Jam FH/SSMA," Military Communications Conference—Proceedings of MILCOM '98, Boston, Massachusetts, Oct. 18, 1998, pp. 170-175, IEEE, New York, NY, US.

Gracie et al., "Turbo and Turbo-Like Codes: Principles and Applications in Telecommunications," Proceedings of the IEEE, Jun. 2007, pp. 1228-1254, vol. 95, No. 6, IEEE, New York, NY, US.

* cited by examiner

PARITY BIT SOFT ESTIMATION METHOD AND APPARATUS

TECHNICAL FIELD

The present invention generally relates to processing received symbols, and more particularly relates to increasing the accuracy of soft estimates computed for both systematic bits and corresponding parity bits extracted from the received symbols.

BACKGROUND

In wireless communications, digital data is transmitted over the air via analog waveforms. Binary information is mapped into complex-valued modulated symbols representing one or more bits. Optional pulse shaping filtering and/or other processing is applied to the symbols and the signal is up-converted to RF. At the receiver, the signal is down-converted and optionally filtered, processed and sampled. The transmitted symbols are then estimated from the received samples. Individual bits embedded in each symbol are extracted during demodulation.

In some cases, demodulation involves making hard decisions on the received symbols, i.e., finding the constellation point closest to the received value and using the bit sequence associated with the constellation point as the transmitted bit sequence. This approach is used when the transmitted data is not coded or when only hard decoding algorithms are employed. Performance can be improved by using error correction codes to transmit the data. One conventional encoder is a Turbo encoder. A Turbo encoder typically includes two parallel concatenated convolutional encoders. A data stream is input to the encoder and each constituent encoder produces a parity stream. Thus, two parity bits are output by the Turbo encoder for each systematic bit, yielding a code rate of ⅓. Optionally, puncturing or repetition can be applied to achieve any desired code rate larger than 0 and smaller than 1.

At the receiver, a corresponding Turbo decoder exchanges soft information extracted from the systematic bits between constituent decoders, iteratively refining the systematic bit soft information. The Turbo decoder operates on initial soft information for both the systematic and parity bits. The initial soft bit estimates are typically generated by a demodulator. The soft bit estimates are typically expressed as log-likelihood ratios (LLRs), where LLR is the log of the ratio of the probability that a given bit is "1" to the probability that the bit is "0". Code constraints placed on the Turbo decoder are utilized each iteration to increase the reliability of the per-systematic bit LLR values. The transmitted information sequence is recovered by making hard decisions on the revised soft estimates of the systematic bits after a number of decoding iterations.

The LLR values of the parity bits are computed during demodulation and used during decoding, but are not conventionally revised as are the systematic bit LLR values. For example, receivers employing interference cancellation may regenerate transmitted symbols using the soft systematic and parity bits. The regenerated symbols are then used to cancel interference. However, only the systematic bit LLR values are typically updated during the traditional Turbo decoding process. This in turn reduces the accuracy of the regenerated soft symbols because both the systematic bits and corresponding parity bits are needed to reconstruct transmitted symbols.

SUMMARY

Transmitted symbols including at least one systematic bit and at least one parity bit per systematic bit are received and demodulated. The systematic and parity bits are tightly coupled to each other because of the way in which the information is encoded at the transmitter. The relationship between each systematic bit and respective parity bits can be exploited to improve the accuracy of soft bit estimation for both the systematic bits and parity bits. For example, if significant improvement in the LLR value of a systematic bit is observed, a similar improvement can be made to the LLR value of the associated parity bit(s). Thus, the systematic bit soft estimates can be reused to improve the estimation accuracy of the parity bits without having to iteratively re-compute parity bit soft estimates in the same way as the systematic bit soft estimates.

Initial soft estimates of each systematic bit and corresponding parity bit(s) are computed, e.g., during demodulation. Each systematic bit soft estimate is further refined during an iterative decoding process which operates on the initial sequence of systematic and parity bit soft estimates. Each iteration of the decoding process attempts to improve the overall accuracy of the systematic bit soft estimates. In one embodiment, the revised systematic bit soft estimates at the end of the iterative decoding process are used to update the corresponding initial parity bit soft estimates computed during demodulation. In another embodiment, the systematic bit soft information improvement achieved after each iteration may be accumulatively applied to the corresponding parity bit soft estimates. In either case, the soft bit estimates for both the parity and systematic bits are revised instead of just the systematic bit soft estimates. This improves the soft estimate accuracy of the parity bits without having to explicitly compute new LLRs or other metrics for the parity bits during decoding. Instead, the initial parity bit soft estimates computed during demodulation are revised based on updates made to the systematic bit soft estimates during decoding. The newly revised systematic and parity soft bit estimates can then be used to assist in further signal processing. In one embodiment, the receiver regenerates transmitted symbols based on the revised soft estimates of the parity and systematic bits and uses the regenerated soft symbols to perform successive interference cancellation.

According to an embodiment, a received symbol having one or more parity bits for each systematic bit of the received symbol is processed by demodulating the received symbol to determine an initial soft estimate of each systematic bit and corresponding one or more parity bits in the sequence. The systematic bit sequence is iteratively decoded to revise the soft estimate of each systematic bit. The initial soft estimate of the one or more parity bits associated with each systematic bit is revised based on the revised soft estimate of the systematic bit. The received symbol can be decoded or regenerated based on the revised soft estimate of each systematic bit and corresponding one or more parity bits.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
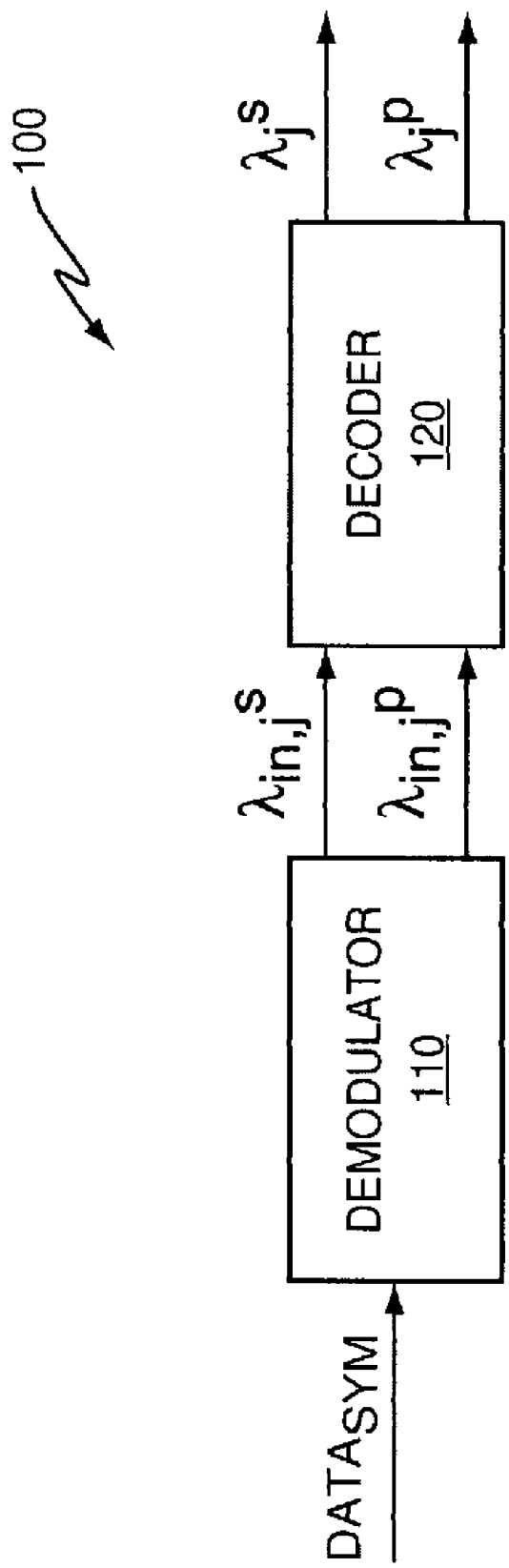
FIG. 1 is a block diagram of an embodiment of a baseband processor including a demodulator and a decoder.

FIG. 1 illustrates an embodiment of a baseband processor 100 included in a receiver. The baseband processor 100 computes soft estimates of systematic and parity bits extracted from received symbols and revises both types of soft bit estimates to improve overall soft estimation accuracy of the receiver. The revised systematic and parity soft bit estimates can be used to aid in received signal processing as described later herein. In more detail, the baseband processor 100 includes a demodulator 110 and a decoder 120. Received symbols are down-converted, optionally filtered and processed and sampled to estimate the transmitted symbols from the received data, e.g., as illustrated by Step 200 of FIG. 2. The down-converted symbol data ($DATA_{SYM}$) is input to the demodulator 110 and processed to extract individual systematic and corresponding parity bits embedded in each symbol. Particularly, the demodulator 110 computes an initial soft estimate of each systematic bit and corresponding parity bit, e.g., as illustrated by Step 202 of FIG. 2. In one embodiment, the demodulator 110 derives the initial soft bit estimates by computing LLR values indicating the probability that each bit is of a particular value. The soft estimate of the jth systematic bit ($\lambda_{in,j}^s$) and each corresponding parity bit ($\lambda_{in,j}^p$) are input to the decoder 120 for further refinement.

Figure 2:
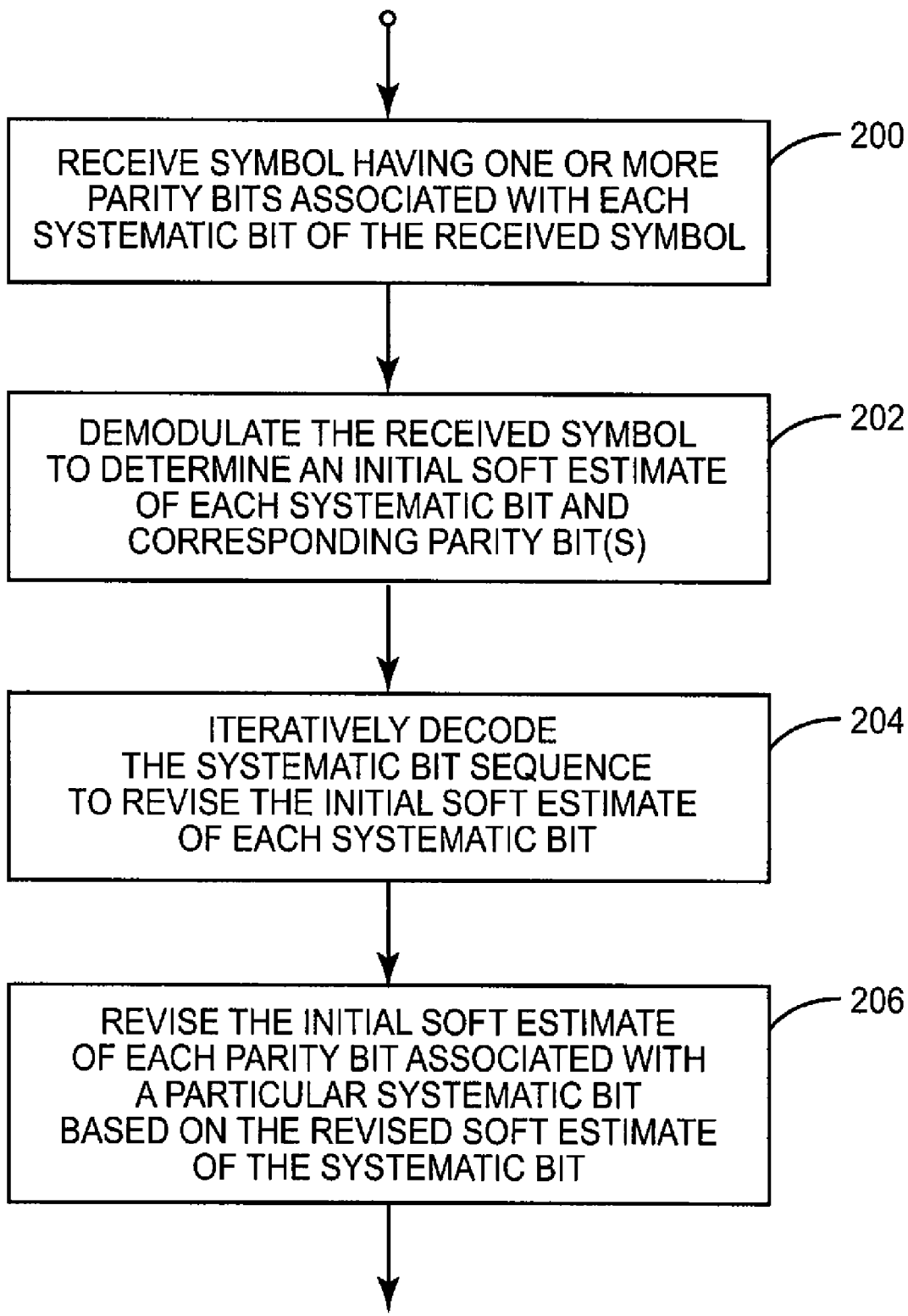
FIG. 2 is a flow diagram of an embodiment of a method for processing a received symbol having one or more parity bits for each systematic bit of the received symbol.

The decoder 120 iteratively decodes the systematic bit sequence based on the demodulated received symbol sequence and revises the initial soft estimate of the jth systematic bit based on the iterative decoding results, e.g., as illustrated by Step 204 of FIG. 2. The decoder 120 also revises the initial soft estimate of each parity bit associated with the jth systematic bit based on the revised soft estimate of the systematic bit, e.g., as illustrated by Step 204 of FIG. 2. This way, both the systematic bit and each corresponding parity bit have comparable estimation accuracy without the decoder 120 having to explicitly compute new LLRs or other metrics for each parity bit in the same way that the systematic LLR values are re-computed. Instead, the initial parity bit soft estimates computed during demodulation are revised based on the systematic bit soft estimate updates computed by the decoder 120. This improves the soft estimate accuracy of both the jth systematic bit and each corresponding parity bit without significantly increasing the size or power consumption of the decoder 120. In one embodiment, the decoder 120 uses Turbo codes to revise the soft bit estimates input from the demodulator 110.

Figure 3:
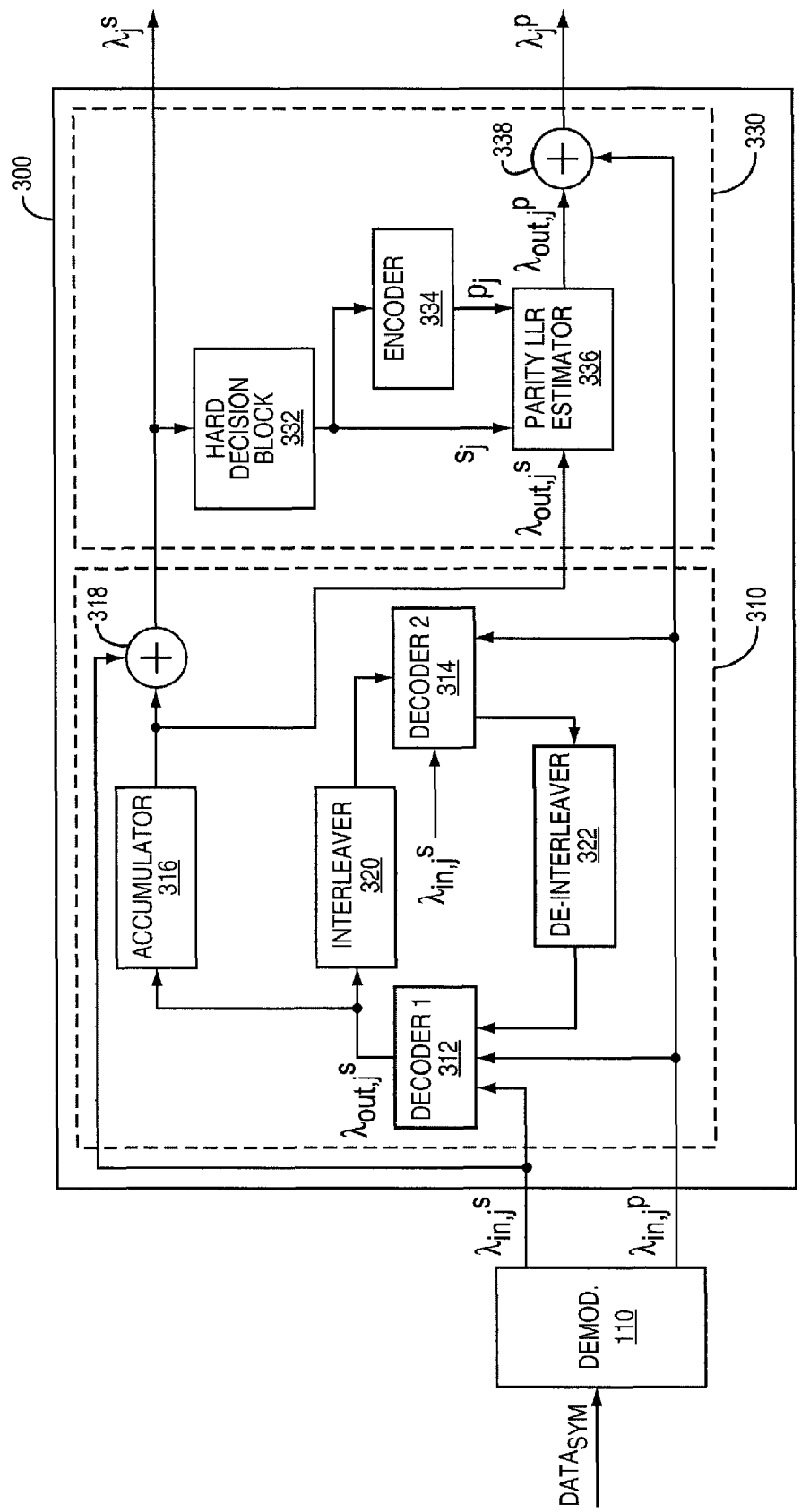
FIG. 3 is a block diagram of an embodiment of a soft bit decoder.

FIG. 3 illustrates an embodiment of a Turbo decoder 300. The Turbo decoder 300 receives soft systematic and parity bit estimates from the demodulator 110. According to one embodiment, the soft bit estimates are computed as LLR values. The LLR value for bit j at the output of the demodulator 110 is computed as given by:

$$\lambda_j = \ln \frac{P(r \mid c_j = 1)}{P(r \mid c_j = 0)} \quad (1)$$

where $c_j$ is the demodulated bit and r the received symbol. Consider, for example, QAM (quadrature amplitude modulation) where $\lambda_j$ may be defined as a ratio of sums of conditional probabilities with given bit values in the position of interest as given by:

$$\lambda_j = \ln \frac{\sum_{C_k : c_j = 1} P(r \mid s(C_k))}{\sum_{C_k : c_j = 0} P(r \mid s(C_k))} \quad (2)$$

where s(C) is the constellation symbol associated with a bit sequence C. The numerator in equation (2) represents the sum over all bit sequences that contain the bit of interest in state 1 and the denominator represents the sum over all bit sequences that contain the bit of interest in state 0. The soft bit estimates computed by the Turbo decoder 300 can be updated in accordance with a SISO (soft-input, soft-output) algorithm such as the BCJR algorithm.

In more detail, the Turbo decoder 300 includes a decoding section 310 having constituent decoder blocks 312, 314, an accumulator 316, signal combiner 318, an interleaver 320 and a de-interleaver 322. Each decoder block 312, 314 performs backward-forward recursions and updates the probabilities of all trellis states by combining information from the received symbols, the other constituent decoder, and code constraints placed on the decoder. The code constraints placed on each decoder block 312, 314 are a function of the encoding used to generate the modulated symbols being processed by the Turbo decoder 300. For each trellis section with N states and one systematic bit per section, the soft estimate $\lambda_{out,j}^s$ of the jth systematic bit is computed by evaluating two or more sums (e.g., one sum for branches with a systematic bit=1 and one sum for branches with a systematic bit=0) over N terms each. During and after decoding, the likelihood that systematic bit j is of a particular value is revised by combining the initial soft bit estimate $\lambda_{in,j}^s$ computed by the demodulator 110 and the revised soft bit estimate $\lambda_{out,j}^s$ newly computed during each decoder iteration as given by:

$$\lambda_j^s = \lambda_{in,j}^s + \lambda_{out,j}^s \quad (3)$$

The accumulator 316 can accumulate the decoded extrinsic information over multiple iterations, e.g., by integrating, summing or otherwise processing soft bit computations output by the decoder 312 over a plurality of iterations. The signal combiner 318 outputs the revised soft bit estimate $\lambda_{out,j}^s$ by combining the accumulator output with the most recent decoded extrinsic information.

The likelihood that each corresponding parity bit is of a particular value is also determined by combining the initial soft parity bit estimate $\lambda_{in,j}^p$ computed by the demodulator 110 and the revised soft parity bit estimate $\lambda_{out,j}^p$ computed by the decoder 300 as given by:

$$\lambda_j^p = \lambda_{in,j}^p + \lambda_{out,j}^p \quad (4)$$

The Turbo decoder 300 computes the revised soft parity bit estimate $\lambda_{out,j}^p$ based on the newly revised soft estimate $\lambda_{out,j}^s$ of the corresponding systematic bit without explicitly computing a new LLR value for each parity bit. To this end, the Turbo decoder 300 includes an estimation section 330 that utilizes the tight coupling between systematic and parity bits to revise the initial soft parity bit estimates computed by the demodulator 110. The estimation section 330 of the decoder 300 revises the initial soft estimate of each parity bit input to the decoding section 310 based on the revised soft estimate of the corresponding systematic bit computed by the decoding section 310. The "sign" of the parity bit LLR is determined so that the accuracy improvement to the systematic bit soft estimate can be applied to the corresponding parity bit.

In one embodiment, a SISO process implemented by the Turbo decoder 300 is a symbol-by-symbol MAP algorithm. As such, the output of the decoder section 310 provides a best guess for each systematic bit, but not for a sequence of systematic bits. Therefore, the estimated systematic bit value does not directly map to a corresponding parity bit value because several edges in the corresponding trellis section are associated with the systematic bit value and may have produced the parity bit, depending on the path taken in the corresponding encoder trellis. Accordingly, the estimation section 330 includes a hard decision block 332 for making a hard decision on the revised systematic bit LLR $\lambda_j^s$ to determine the current systematic bit state $s_j$ as given by:

$$s_j = \begin{cases} 1, & \lambda_j^s > 0 \\ 0, & \lambda_j^s \leq 0 \end{cases} \quad (5)$$

The parity bit $p_j$ can be generated by reproducing the path in the trellis corresponding to the sequence of systematic bits processed so far. In an embodiment, the estimation section 330 of the decoder 300 includes an encoder 334 for generating the parity bit based on the systematic bit sequence input to the encoder 334 from the hard decision block 332 as given by:

$$p_j = E(s_1, \ldots, s_j) \quad (6)$$

The encoder 334 can be implemented as a state machine with memory $\log_2 N$ that essentially mimics the constituent encoder structure at the transmitter (not shown). A parity bit LLR estimator 336 computes a new soft estimate $\lambda_{out,j}^p$ for each parity bit associated with the jth systematic bit based on the hard systematic and parity bits $(s_j, p_j)$ and the revised soft estimate of the jth systematic bit.

According to one embodiment, a new soft estimate of the parity bit is computed according to:

$$\lambda_{out,j}^p = \begin{cases} \lambda_{out,j}^s, & p_j = s_j \\ -\lambda_{out,j}^s, & p_j \neq s_j \end{cases} \quad (7)$$

In another embodiment, a new parity bit soft estimate is computed as given by:

$$\lambda_{out,j}^p = \lambda_{out,j}^s | \cdot sgn(p_j - 0.5) \quad (8)$$

In each case, a signal combiner 338 combines the new parity bit soft estimate and the initial soft estimate computed by the demodulator 110 in accordance with equation (4). In the typical turbo code setup, two parity streams are present for each systematic bit. The Figures show a single parity bit for each systematic bit for ease of illustration only. One skilled in the art will recognize that the embodiments illustrated and described herein can be readily extended to regenerating multiple parity LLR streams per systematic bit.

Figure 4:
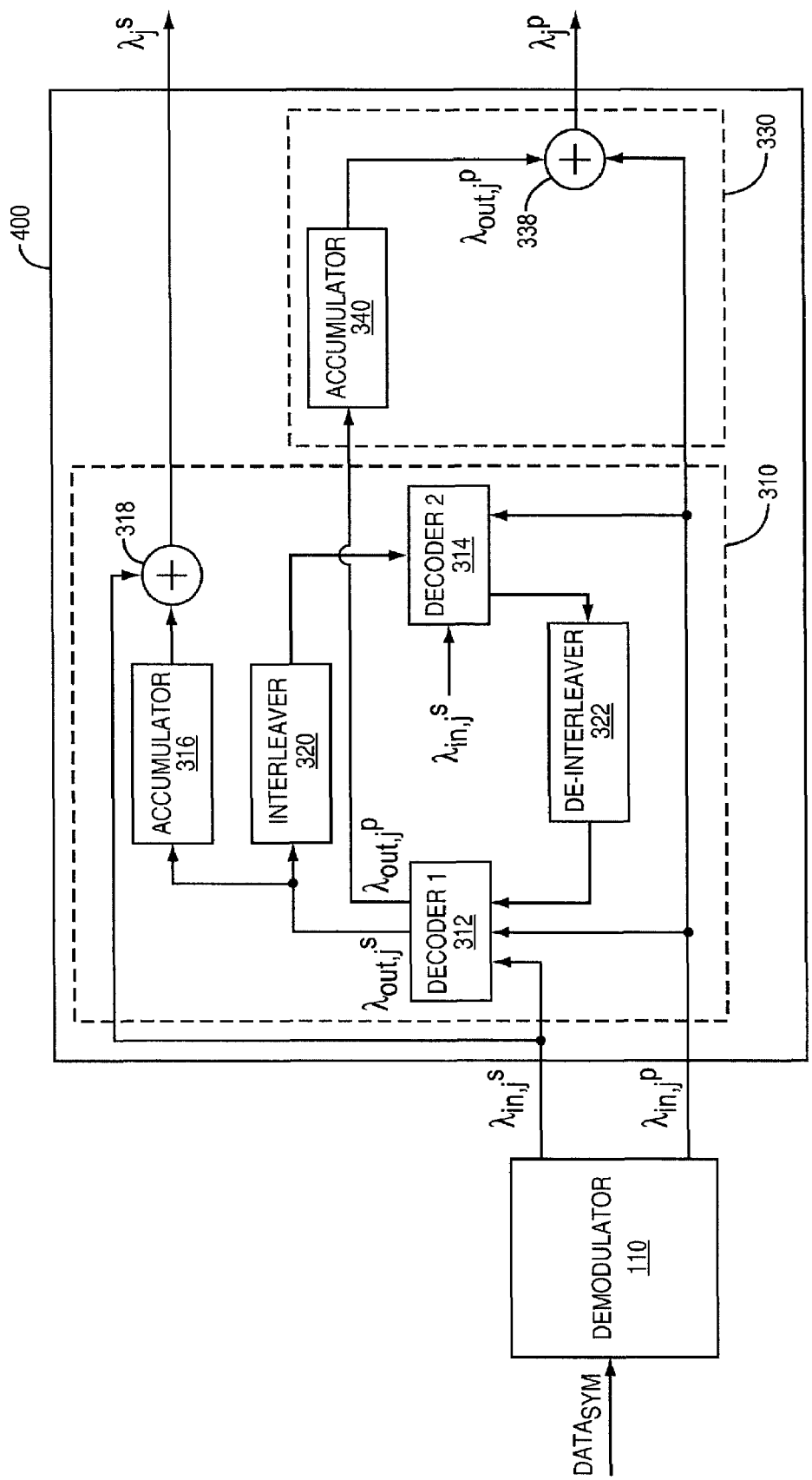
FIG. 4 is a block diagram of another embodiment of a soft bit decoder.

FIG. 4 illustrates another embodiment of a Turbo encoder 400. According to this embodiment, the decoding section 310 of the decoder 400 utilizes the branch with the maximum likelihood in either set of trellis branches that involved a transition with the systematic bit labeled "0" and "1". Then, the encoder 334 shown in FIG. 3 is not needed according to the Turbo decoder 400 embodiment of FIG. 4 because only the two most likely trellis branches for "0"- and "1"-transitions, respectively, are involved in calculating the new systematic bit LLR value $\lambda_{out,j}^s$. Each parity bit linked to the two trellis branches is known a priori from the trellis diagram of the constituent encoder at the transmitter (not shown).

Accordingly, the parity bit $p_j$ can be generated based on the sign of the log likelihood value of the two dominant terms in the LLR evaluation. Particularly, let $e_j^{(1)}$ be the largest log likelihood value over all trellis edges with $s_j=1$ and $e_j^{(0)}$ the largest log likelihood value over the trellis edges with $s_j=0$. The respective parity bit labels for those edges are $p_j^{(1)}$ and $p_j^{(0)}$. The parity bit can then be generated as given by:

$$p_j = \begin{cases} p_j^{(1)}, & |e_j^{(1)}| > |e_j^{(0)}| \\ p_j^{(0)}, & |e_j^{(1)}| \leq |e_j^{(0)}| \end{cases} \quad (9)$$

A new soft estimate $\lambda_{out,j}^p$ of the parity bit is then computed by the decoding section 310, e.g., in accordance with equation (7) or (8). In one embodiment, an accumulator 340 can accumulate the decoded parity information over multiple iterations, e.g., by integrating, summing or otherwise processing soft parity bit computations output by the decoder 312 over a plurality of iterations. The signal combiner 338 of the estimation section 330 revises the initial soft parity bit estimate $\lambda_{in,j}^p$ output by the demodulator 110 by combining the initial estimate and the newly accumulated parity bit soft estimate.

In each Turbo decoder embodiment, the parity bit updated soft information can be generated only during the last decoding iteration. Alternatively, the extrinsic information can be accumulated during any prior period of the decoding process, e.g., after each decoding iteration. Accordingly, the constituent decoders 312, 314 can output the systematic and/or parity extrinsic information which is accumulated over multiple decoder iterations to produce a posteriori LLR values. Alternatively, the constituent decoders 312, 314 output a posteriori LLR values after each decoder iteration. In either case, parity sequence generation is performed within each Turbo decoder 300, 400 and each decoder 300, 400 outputs a full sequence of systematic LLR and parity LLR values as shown in FIGS. 3 and 4, respectively.

Figure 5:
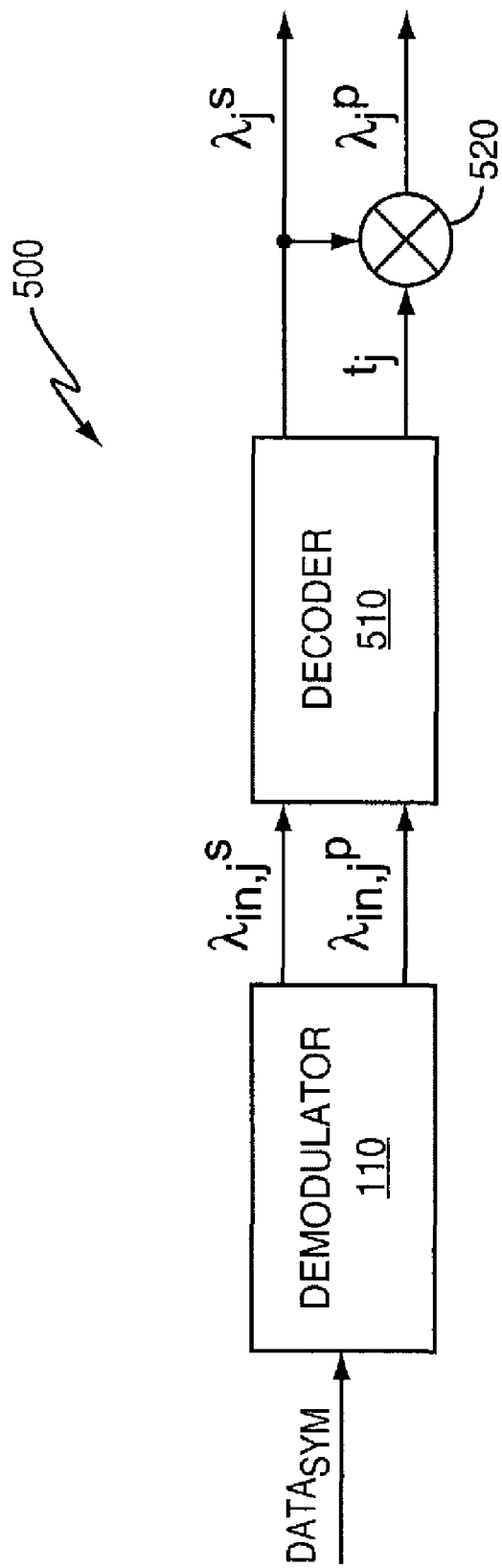
FIG. 5 is a block diagram of another embodiment of a baseband processor including a demodulator and a decoder.

FIG. 5 illustrates another embodiment of a baseband processor 500 where a decoder 510 outputs a full LLR sequence for each systematic bit, but only a sign adjustment sequence $t_j$ for converting the systematic bit information to parity LLR values. In one embodiment, the sign adjustment sequence comprises a sequence of single-bit values for each parity bit as given by:

$$t_j = \begin{cases} 1, & p_j = s_j \\ -1, & p_j \neq s_j \end{cases} \quad (10)$$

The decoder 510 can generate each parity bit as described above, e.g., in accordance with equations (6) or (9). In each case, a multiplier 520 combines the revised soft estimate $\lambda_j^s$ for the jth systematic bit with the corresponding single-bit sign adjustment value $t_j$ to compute the revised soft parity bit estimate $\lambda_j^p$.

Figure 6:
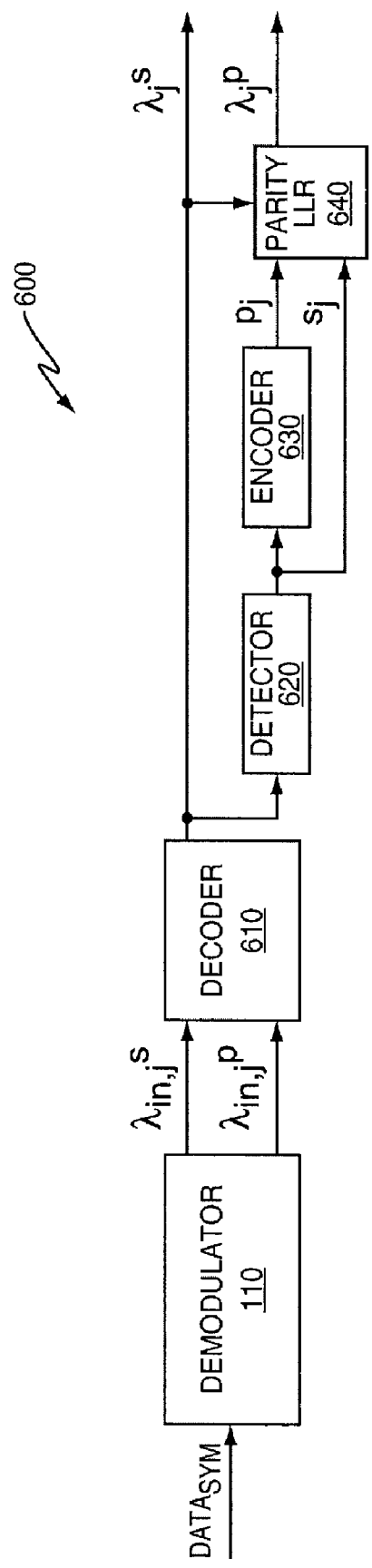
FIG. 6 is a block diagram of yet another embodiment of a baseband processor including a demodulator and a decoder.

FIG. 6 illustrates yet another embodiment of a baseband processor 600 where a decoder 610 outputs only the systematic bit LLR values. The parity sequence generation and sign correction is performed as post-processing after decoding. Particularly, a detector 620 makes a hard bit decision based on the revised LLR value $\lambda_j^s$ for the jth systematic bit to determine the current systematic bit state $s_j$, e.g., in accordance with equation (5). An encoder 630 generates the parity bit $p_j$ by reproducing the path in the trellis corresponding to the sequence of systematic bits processed so far by the decoder 620, e.g., in accordance with equation (6) or by the max-"0" and "1" transition approach previously described herein. A parity bit LLR estimator 640 computes a new soft estimate $\lambda_j^p$ for each parity bit associated with the jth systematic bit based on the hard systematic and parity bits ($s_j$, $p_j$) and the revised soft estimate of the jth systematic bit computed by the decoder 610. The parity bit LLR estimator 640 computes the new soft parity bit estimate $\lambda_j^p$, e.g., in accordance with equation (7) or (8).

The various soft bit estimation embodiments described herein may yield incorrect decisions when bit reliability is low, but these incorrect decisions only marginally degrade overall receiver performance because the magnitude of the soft estimates allocated to the parity bits is relatively small and has insignificant impact on the symbol estimates under these conditions. However, when the systematic bit LLR values are relatively large and thus so are the associated parity bit LLR values, the parity sequence estimation becomes highly reliable. The various embodiments described herein can be directly used with Turbo decoders that implement any suitable log-domain decoding algorithm, e.g. log-MAP or max-log-MAP. The various embodiments described herein can also be applied to probability-domain SISO decoders or to other error correction codes besides Turbo codes where soft LLR values of the systematic bits are produced as part of the decoding process. Furthermore, the various embodiments described herein may also be applied to concatenated coding/decoding structures with higher rates, e.g. when the label of each constituent code trellis transition contains more than one systematic bit.

The various embodiments described herein generate revised soft information for all symbol bits after decoding instead of updating only the systematic bit soft information. In addition, decoder complexity need not be increased, and an existing decoder design can be re-used with only slight modifications to the interface. The soft systematic and parity bit information can be used to aid in received signal processing. In one embodiment, the soft bit information is used during interference cancellation (IC).

Figure 7:
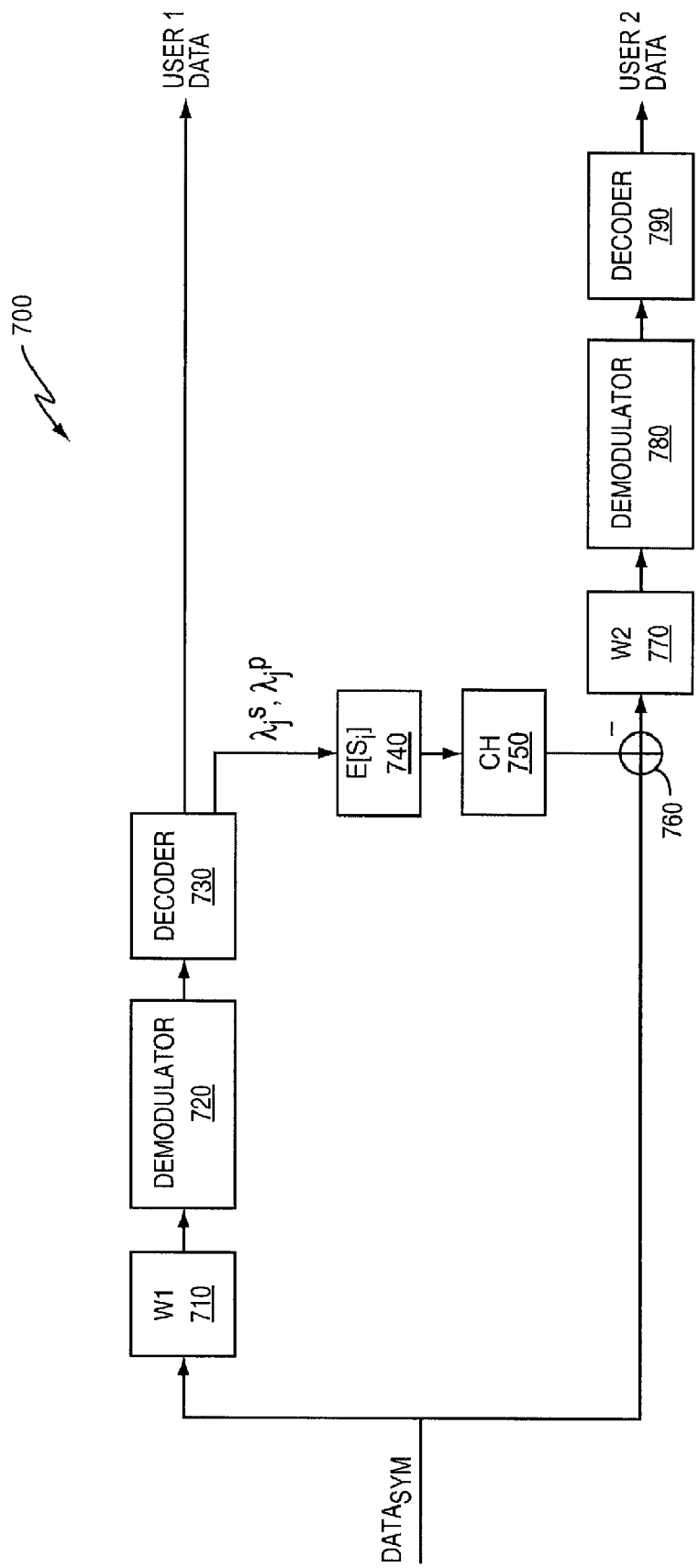
FIG. 7 is a block diagram of an embodiment of a successive interference cancellation component of a baseband processor.

FIG. 7 illustrates an embodiment of an IC component 700 that can be implemented by any of the baseband processors described herein. In one embodiment, the IC component 700 performs successive IC that exploits the revised soft systematic and parity information for improving interference cancellation. In more detail, the IC component 700 detects and cancels the contribution of one or more interfering users from the down-converted symbol data ($DATA_{SYM}$). The IC component 700 includes a first combining weight estimator 710 and demodulator 720 for generating initial soft bit estimates input to a first decoder 730. The first decoder 730 implements any of the various soft estimation embodiments described herein. Accordingly, the first decoder 730 outputs bit data associated with a first user and revised soft systematic and parity estimates $\lambda_j^s$ and $\lambda_j^p$ for the jth systematic bit extracted from the data as previously described herein. The corresponding transmitted symbol is regenerated by a symbol estimator 740 and modified by a channel estimator 750 to mimic the channel over which the symbol was transmitted. The modified symbol data is subtracted 760 from the received symbol data to cancel the contribution of the first user's data from the second user's data. The modified symbol data is processed by a second combining weight estimator 770, demodulator 780 and decoder 790 to recover the second user's data. Additional interfering users may be considered and the described procedure is repeated accordingly. Regardless, the interference cancellation is more robust when both the systematic bit and parity bit soft estimates are revised as described herein.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a received symbol having one or more parity bits for each systematic bit in a sequence of one or more systematic bits, the method comprising:
    demodulating the received symbol to determine an initial soft estimate of each systematic bit and the corresponding one or more parity bits;
    iteratively decoding the systematic bit sequence to revise the soft estimate of each systematic bit; and
    revising the initial soft estimate of the one or more parity bits associated with each systematic bit based on the revised soft estimate of the systematic bit.

2. The method of claim 1, wherein revising the initial soft estimate of the one or more parity bits associated with each systematic bit comprises:
    generating a hard bit value for each parity bit; and
    applying an update to each parity bit soft value, the update having a magnitude equal to a magnitude of the revised soft estimate of the systematic bit and a sign equal to a sign of the revised soft estimate of the systematic bit when the hard bit value generated for the parity bit matches a hard bit value generated for the systematic bit and the opposite sign otherwise.

3. The method of claim 2, comprising generating the hard bit value for each parity bit based on a trellis location the corresponding systematic bit most likely originated from.

4. The method of claim 3, wherein generating the hard bit value for each parity bit based on a trellis location the corresponding systematic bit most likely originated from comprises:
    re-encoding the hard bit value generated for the systematic bit to generate a re-encoded bit sequence; and
    generating the hard bit value for each parity bit based on the re-encoded bit sequence.

5. The method of claim 3, comprising generating the hard bit value for each parity bit based on which one of a plurality of trellis branches most likely corresponds to the respective systematic bit.

6. The method of claim 5, comprising identifying the trellis branch having a maximum associated log-likelihood magnitude among all trellis branches in a particular stage.

7. The method of claim 1, wherein revising the initial soft estimate of the one or more parity bits associated with each systematic bit comprises:
    determining a sign for each parity bit based on whether a hard bit value generated for the parity bit matches a hard bit value generated for the systematic bit; and
    revising the initial soft estimate of each parity bit by combining the revised soft estimate of the systematic bit and the initial soft estimate of the parity bit.

8. The method of claim 1, further comprising decoding or regenerating the received symbol based on the revised soft estimate of each systematic bit and corresponding one or more parity bits.

9. The method of claim 1, comprising regenerating the received symbol and performing successive interference cancellation based at least in part on the regenerated symbol.

10. A receiver comprising a baseband processor configured to:
- demodulate a received symbol to determine an initial soft estimate of each systematic bit and corresponding one or more parity bits of the received symbol, the received symbol having a sequence of one or more systematic bits;
- iteratively decode the systematic bit sequence to revise the soft estimate of each systematic bit; and
- revise the initial soft estimate of the one or more parity bits associated with each systematic bit based on the revised soft estimate of the systematic bit.

11. The receiver of claim 10, wherein the baseband processor is configured to generate a hard bit value for each parity bit and apply an update to each parity bit soft value, the update having a magnitude equal to a magnitude of the revised soft estimate of the systematic bit and a sign equal to a sign of the revised soft estimate of the systematic bit when the hard bit value generated for the parity bit matches a hard bit value generated for the systematic bit and the opposite sign otherwise.

12. The receiver of claim 11, wherein the baseband processor is configured to generate the hard bit value for each parity bit based on a trellis location the corresponding systematic bit most likely originated from.

13. The receiver of claim 11, wherein the baseband processor is configured to re-encode the hard bit value generated for the systematic bit to yield a re-encoded bit sequence and generated the hard bit value for each parity bit based on the re-encoded bit sequence.

14. The receiver of claim 12, wherein the baseband processor is configured to generate the hard bit value for each parity bit based on which one of a plurality of trellis branches most likely corresponds to the respective systematic bit.

15. The receiver of claim 14, wherein the baseband processor is configured to identify the trellis branch having a maximum associated log-likelihood magnitude among all trellis branches in a particular stage.

16. The receiver of claim 10, wherein the baseband processor is configured to determine a sign for each parity bit based on whether a hard bit value generated for the parity bit matches a hard bit value generated for the systematic bit and revise the initial soft estimate of each parity bit by combining the revised soft estimate of the systematic bit and the initial soft estimate of the parity bit.

17. The receiver of claim 10, wherein the baseband processor is further configured to decode or regenerate the received symbol based on the revised soft estimate of each systematic bit and corresponding one or more parity bits.

18. The receiver of claim 10, wherein the baseband processor is configured to regenerate the received symbol and perform successive interference cancellation based at least in part on the regenerated symbol.

19. A decoder comprising:
- a decoding section configured to iteratively revise an initial soft estimate of a systematic bit input to the decoding section based on the initial soft estimate of the systematic bit and an initial soft estimate of one or more related parity bits input to the decoding section; and
- an estimation section configured to revise the initial soft estimate of each parity bit input to the decoding section based on the revised soft estimate of the systematic bit determined by the decoding section.

20. The decoder of claim 19, wherein the estimation section is configured to:
- generate a hard bit value for the systematic bit;
- re-encode the hard systematic bit value into a re-encoded bit sequence; and
- generate a hard bit value for each parity bit based on the re-encoded bit sequence.

21. The decoder of claim 20, wherein for each parity bit, the estimation section is configured to apply an update to the parity bit soft value, the update having a magnitude equal to a magnitude of the revised soft estimate of the systematic bit and a sign equal to a sign of the revised soft estimate of the systematic bit when the hard bit value generated for the parity bit matches the hard bit value generated for the systematic bit and the opposite sign otherwise.

22. The decoder of claim 19, wherein the decoding section is configured to generate a hard bit value and sign for each parity bit based on which one of a plurality of trellis branches the systematic bit most likely originated from.

23. The decoder of claim 22, wherein the decoding section is configured to identify the trellis branch having a maximum associated log-likelihood magnitude among all trellis branches in a particular stage.

24. The decoder of claim 22, wherein for each parity bit, the decoding section is configured to assign the revised soft estimate of the systematic bit as a new soft estimate of the parity bit based on the hard bit value and sign of the parity bit and the estimation section is configured to combine the new soft estimate of the parity bit and the initial soft estimate of the parity bit.

\* \* \* \* \*

UNITED STATES PATENT AND TRADEMARK OFFICE
CERTIFICATE OF CORRECTION

PATENT NO. : 8,161,358 B2
APPLICATION NO. : 12/245963
DATED : April 17, 2012
INVENTOR(S) : Kamuf et al.

It is certified that error appears in the above-identified patent and that said Letters Patent is hereby corrected as shown below:

IN THE SPECIFICATIONS:

In Column 5, Line 49, Equation 8, delete " $\lambda_{out,j}^{s} | \cdot sgn$ " and insert -- $|\lambda_{out,j}^{s}| \cdot sgn$ --, therefor.

Signed and Sealed this
Twenty-sixth Day of February, 2013

Teresa Stanek Rea
*Acting Director of the United States Patent and Trademark Office*